(12) United States Patent
    Koshi

(10) Patent No.: US 9,412,522 B2
(45) Date of Patent: Aug. 9, 2016

(54) HOLLOW CYLINDRICAL CAPACITOR AND INVERTER DEVICE

(71) Applicant: AISIN SEIKI KABUSHIKI KAISHA, Kariya-shi, Aichi-ken (JP)

(72) Inventor: Naoki Koshi, Toyota (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 10 days.

(21) Appl. No.: 14/377,447

(22) PCT Filed: Feb. 27, 2013

(86) PCT No.: PCT/JP2013/055114
§ 371 (c)(1),
(2) Date: Aug. 7, 2014

(87) PCT Pub. No.: WO2013/140963
PCT Pub. Date: Sep. 26, 2013

(65) Prior Publication Data
US 2015/0043261 A1    Feb. 12, 2015

(30) Foreign Application Priority Data
Mar. 22, 2012  (JP) .................. 2012-065571

(51) Int. Cl.
*H01G 4/40* (2006.01)
*H02M 7/00* (2006.01)
(Continued)

(52) U.S. Cl.
CPC .................. *H01G 4/40* (2013.01); *H01G 4/228* (2013.01); *H01G 4/232* (2013.01); *H01G 4/35* (2013.01);
(Continued)

(58) Field of Classification Search
CPC ......... H01G 4/12; H01G 4/228; H01G 9/008; H01G 9/151; H02M 7/106
USPC .................. 361/501, 529, 752, 753, 760–765; 363/34, 39, 132
See application file for complete search history.

(56) References Cited

U.S. PATENT DOCUMENTS 3,302,082 A    1/1967  Preissinger
4,264,943 A *  4/1981  Anderson .............. H01G 4/32
                                              29/25.03
(Continued)

FOREIGN PATENT DOCUMENTS

EP    2 190 015    5/2010
GB    1 377 889    9/1973
(Continued)

OTHER PUBLICATIONS

International Search Report for PCT/JP2013/055114 dated Jun. 11, 2013.
(Continued)

*Primary Examiner* — Rajnikant Patel
(74) *Attorney, Agent, or Firm* — Sughrue Mion, PLLC

(57) ABSTRACT

The hollow tubular capacitor includes one side electrode connecting portion having an inner peripheral tubular portion and one side surface portion, the other side electrode connecting portion having an outer peripheral tubular portion and the other side surface portion and an electrostatic capacitance portion having one side electrode plate, the other side electrode plate and a dielectric body, wherein the electrostatic capacitance portion is accommodated in an annular space formed at the inner peripheral tubular portion, the one side surface portion, the outer peripheral tubular portion and the other side surface portion in a high density to reduce inside inductance component. The inverter device is formed such that the hollow tubular capacitor and an annular inverter circuit portion having three-phase upper and lower arms are integrally arranged coaxially on the central axis line.

11 Claims, 13 Drawing Sheets

(51) Int. Cl.
  *H01G 4/35*     (2006.01)
  *H01G 4/38*     (2006.01)
  *H01G 4/232*    (2006.01)
  *H01G 4/228*    (2006.01)
  *H02M 7/537*    (2006.01)
  *H01G 2/14*     (2006.01)

(52) U.S. Cl.
  CPC ............... *H01G 4/38* (2013.01); *H02M 7/003* (2013.01); *H02M 7/537* (2013.01); *H01G 2/14* (2013.01); *Y02T 10/7022* (2013.01)

(56) References Cited

U.S. PATENT DOCUMENTS

| | | | | |
|---|---|---|---|---|
| 5,673,168 | A * | 9/1997 | Efford | H01G 4/32 361/274.2 |
| 5,729,450 | A * | 3/1998 | Dimino | H02M 7/003 363/132 |
| 7,554,324 | B2 * | 6/2009 | Gualtieri | F01D 17/02 324/207.16 |
| 7,898,789 | B1 * | 3/2011 | Jarvinen | B64D 27/24 361/218 |
| 7,974,101 | B2 * | 7/2011 | Azuma | B60K 6/28 361/501 |
| 8,339,079 | B2 * | 12/2012 | Yamada | H01L 25/072 257/618 |
| 8,411,454 | B2 * | 4/2013 | Azuma | B60K 6/48 361/306.1 |
| 2010/0321859 | A1 * | 12/2010 | Hosking | H01G 4/32 361/301.5 |
| 2011/0148337 | A1 | 6/2011 | Yamada | |

FOREIGN PATENT DOCUMENTS

| | | |
|---|---|---|
| JP | 03-185804 A | 8/1991 |
| JP | 2005-065414 A | 3/2005 |
| JP | 2008-079479 A | 4/2008 |
| JP | 2008-192637 A | 8/2008 |
| JP | 2009-048962 A | 3/2009 |
| JP | 2009-088466 A | 4/2009 |
| JP | 2009-111158 A | 5/2009 |
| JP | 2011-023496 A | 2/2011 |
| WO | 2010/049764 | 5/2010 |

OTHER PUBLICATIONS

Extended European Search Report issued Jun. 1, 2015 in European Patent Application No. 13765012.3.

* cited by examiner

HOLLOW CYLINDRICAL CAPACITOR AND INVERTER DEVICE

CROSS REFERENCE TO RELATED APPLICATIONS

This application is a National Stage of International Application No. PCT/JP2013/055114 filed Feb. 27, 2013, claiming priority based on Japanese Patent Application No. 2012-065571, filed Mar. 22, 2012, the contents of all of which are incorporated herein by reference in their entirety.

TECHNICAL FIELD

This invention relates to a capacitor and an inverter device used by connecting in parallel with each other. More particularly, the invention relates to the capacitor and the inverter device, in which a dead space in arrangement thereof can be minimized and a noise generation can be minimized as possible.

BACKGROUND ART

Recently, as a drive source for driving a vehicle, a hybrid vehicle which uses both engine and motor has become rapidly popularized and various types of the drive source for such hybrid vehicle became commercially viable. As for a motor for such system, a three-phase synchronous motor has been frequently used. While a hybrid vehicle is normally running, drive side wheels of the vehicle are driven by supplied electricity from an on-board battery and when the vehicle is stopped (under braking operation), the battery is charged by using regeneration of electricity. Thus, now it is common that a reciprocal electricity conversion is performed by providing a capacitor and the inverter device arranged in parallel between the motor and the on-board battery. The number of components for a hybrid vehicle becomes usually increased due to use of a plurality of drive sources for running the vehicle. This may lead to a space problem in which more components than a regular gasoline powered vehicle have to be accommodated in a limited space in the vehicle. Therefore, a strong desire is raised to minimize the size and weight of the capacitor and the inverter device as much as possible.

The inverter device performs frequently current open/close operation using for example, a PWM control (Pulse Width Modulation control). During such PWM control operation, a surge voltage which includes a high frequency component with a large part is generated and such surge voltage is transferred as a switching noise and further, radiated as a radio wave noise. A size or a level of such surge voltage, switching noise or the radio noise varies depending on the structure of the composing electric circuit. For example, when an inductance component "L" is included in the electric circuit, the surge voltage generated upon interruption of certain electric current "I" can be obtained by the formula "$V=L \cdot (di/dt)$". This means the value "V" of the surge voltage is proportional to the magnitude of the inductance component "L". Further, when the circuit components, such as positive and negative electrodes or the conductive members are not symmetrically arranged in a DC electric circuit, a common mode noise may be generated due to a difference in floating inductance and floating electrostatic capacitance. In a three-phase AC electric circuit, if the structure is not symmetrical, impedance non-equilibrium property may be generated which may lead to a cause of noise generation. When a noise is generated, neighboring electronic control devices or various sensors may be ill-affected.

As a countermeasure for solving the problems of surge voltage and switching noises, a snubber circuit is additionally provided to suppress the generation of the surge voltage or an anti-pressure grade of the power semiconductor module of the inverter device is up-graded to increase the tolerance against the surge voltage or the level of carrier frequency wave of the PWM control may be restricted to a smaller value to restrict a steep voltage change. These measures have not sufficiently solved the problems. Adding a snubber circuit increases the manufacturing cost and up-grading the anti-pressure grade increases the ON-resistance of the module which may lead to a reduction of efficiency in operation. Further, when the carrier frequency is limited to a smaller value, the responsibility of the motor control drops. Thus these conventional means have shown non-preferable big side-effects.

As another measure to suppress or prevent the generation of surge voltage, the inventor of the application has proposed an inverter device which has high equilibrium property, three phase type in a patent literature 1 (PL 1). The inverter device of the PL 1 forms a power semiconductor module by connecting a plurality of equilateral triangle shaped power semiconductor chips and shows an arrangement of six power semiconductor modules in regular hexagon shape. In other words, the inverter device according to the patent literature PL 1 has improved the three phase equilibrium property by arranging the three phases symmetrically in a rotation direction, whereas conventional inverter device has the arrangement of the three phases such that both upper and lower arms are arranged in three straight lines, respectively which may lead to generation of non-equilibrium property.

Further, according to a patent literature 2 (PL 2), the inverter device includes a laminate structure in which a positive electrode side conductor, insulated sheet and a negative electrode side conductor are laminated and the inverter device secures creeping distance and space distance necessary for insulation by using an insulator cap. Thus, according to the PL 2, the opposing currents flowing through the positive and negative electrode side conductors can be approximated to improve the inductance reduction effects greatly. The inventor of this PL 2 says that this may eliminate the use of fuse and snubber circuit.

On the other hand, the motor driving control portion is normally connected the capacitor in parallel with the inverter device. It is important for the capacitor to highly densify the electrostatic capacitance portion and to properly select shape depending on the particular use in order to minimize the size and reduce the weight. It is important for a reduction of generation of surge voltage to reduce the inductance component "L". The patent literatures PL3 and P4 disclose the technology to improve the reduction of inductance in the capacitor.

The patent literature PL3 discloses a capacitor in a case. The two connecting terminals of the capacitor element are penetrating the same side wall of the case and extending out of the case. This can shorten the lead distance of the connecting terminals thereby to reduce inductance ("L" component) of the capacitor compared to the hitherto technology. Further, the patent literature PL4 discloses the metal film capacitor and the electrode structure of the neighboring capacitor elements are arranged in opposite directions with each other and current flows in reverse direction to reduce the internal inductance. The patent literature PL4 further discloses the overlapping arrangement of the first and the second electrode plates (members for wiring) connected to the two sets of capacitor elements. This can also reduce the wiring inductance.

CITATION LIST

Patent Literature

[Patent Literature 1] JP2009-88466 A
[Patent Literature 2] JP2005-65414 A
[Patent Literature 3] JP2009-111158 A
[Patent Literature 4] JP2011-23496 A

SUMMARY OF INVENTION

Technical Problem(s)

However, according to the patent literatures PL 2 through 4, since the positive and negative conductors for connecting the inverter device and the capacitor with external devices are arranged in parallel with each other, sufficient reduction of the inductance component "L" cannot be achieved. Further, according to the patent literature PL1, three phases are arranged symmetrically in a rotation direction in the inverter device, but it does not refer to the connection structure of the capacitor and DC power supply source. Accordingly, a concern of possible generation of the surge voltage "V" effected by the induction component "L" has not been completely eliminated Still further, the capacitor has a tendency that larger the size, greater the inductance component "L" becomes. In order to reduce the size to avoid such tendency, a plurality of capacitor elements is combined. This may, however, increase the dead space ratio and it is difficult to achieve size reduction and weight reduction. As to the inverter device, the conventional three phase parallel arrangement cannot sufficiently reduce the inductance component "L" as well as the size and weight reduction. Accordingly, in order to cope with the problems it is not sufficient to review the capacitor alone or the inverter device alone and it is important to review an optimum structure of combination of the capacitor and the inverter device.

The present invention was made in consideration with the above drawbacks and the object of the invention is to provide a capacitor which can reduce the internal inductance component compared to the conventional capacitors and at the same time provide an inverter device which can prevent generation of surge voltage more than the conventional devices and achieve the size and weight reductions.

Solution to Problem(s)

The hollow tubular capacitor according to the invention which solved the above problem is characterized in that the hollow tubular capacitor connected in parallel with an inverter circuit portion, includes one side electrode connecting portion having an inner peripheral tubular portion and one side surface portion extending from one end portion of the inner peripheral tubular portion toward an outer peripheral side, the other side electrode connecting portion having an outer peripheral tubular portion arranged coaxially with the inner peripheral tubular portion on a central axis line and the other side surface portion extending from the other end portion of the outer peripheral tubular portion toward an inner peripheral side and an electrostatic capacitance portion having one side electrode plate connected to the one side electrode connecting portion, the other side electrode plate arranged oppositely to the one side electrode plate and connected to the other side electrode connecting portion and a dielectric body disposed between the one side electrode plate and the other side electrode plate, wherein the electrostatic capacitance portion is accommodated in a high density in an annular space formed by the inner peripheral tubular portion, the one side surface portion, the outer peripheral tubular portion and the other side surface portion.

BRIEF DESCRIPTION OF DRAWING(S)

DESCRIPTION OF EMBODIMENTS

Figure 1:
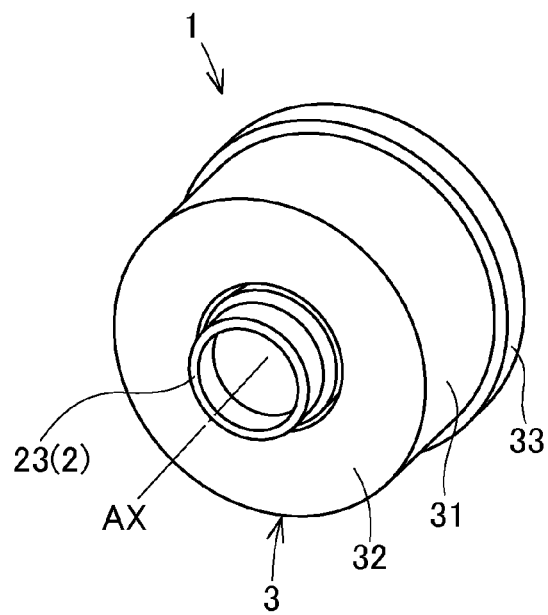
FIG. 1 is a perspective view schematically illustrating a hollow tubular capacitor according to a first embodiment of the invention.
Figure 2:
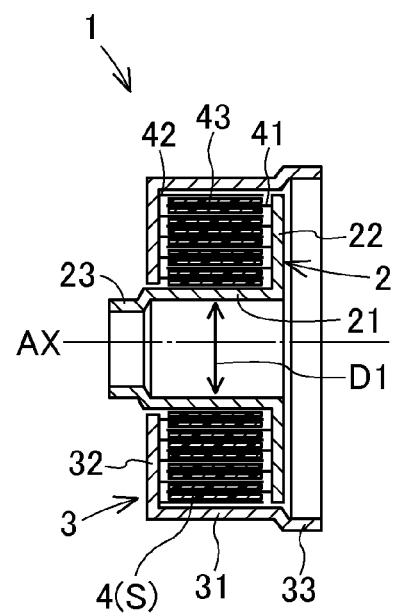
FIG. 2 is a side cross-section view schematically illustrating the hollow tubular capacitor according to the first embodiment of the invention.
Figure 3:
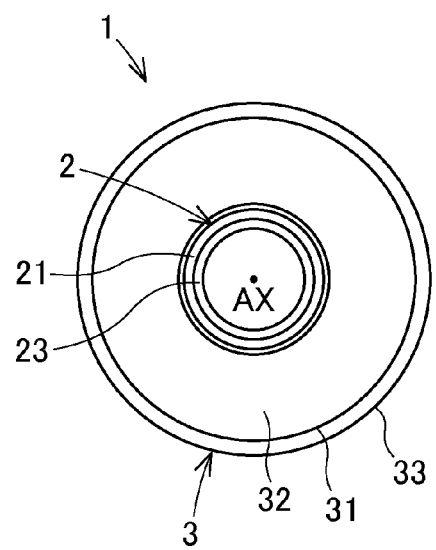
FIG. 3 is a front view of the hollow tubular capacitor according to the first embodiment.
Figure 4:
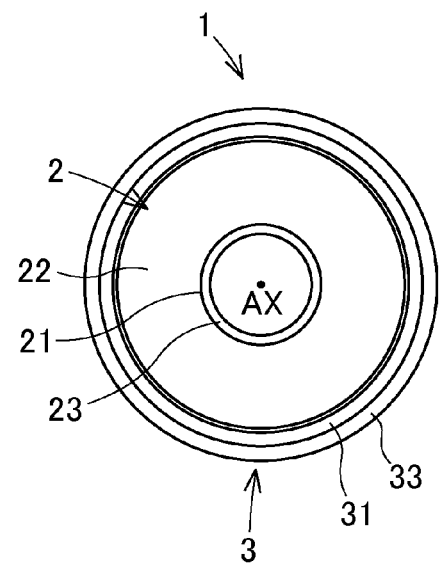
FIG. 4 is a back side view of the hollow tubular capacitor according to the first embodiment.
Figure 5:
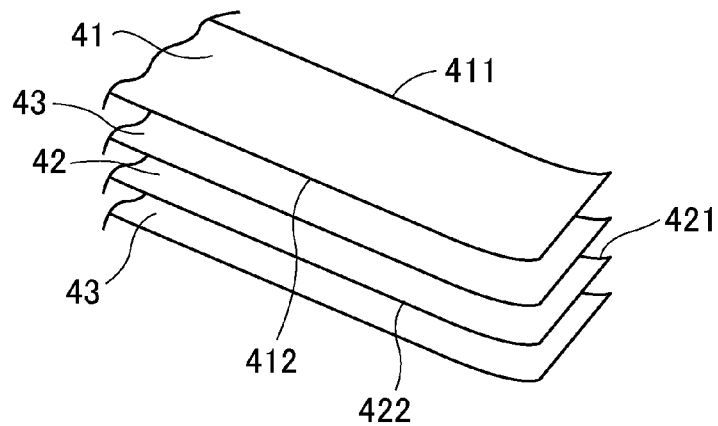
FIG. 5 is an explanatory view explaining the structure of and the method for manufacturing the hollow tubular capacitor according to the first embodiment.

The hollow tubular capacitor according to the first embodiment of the invention will be explained with reference to the attached drawings, particularly, FIGS. 1 through 5. FIG. 1 is a perspective view of schematically illustrated hollow tubular capacitor 1 of the first embodiment and FIG. 2 shows the side cross section of the capacitor. FIG. 3 is a front view of the hollow tubular capacitor 1 according to the first embodiment and FIG. 4 shows a backside of the capacitor. Further, FIG. 5 is an explanatory view explaining the structure of and the method for manufacturing an electrostatic capacitance portion 4 of the hollow tubular capacitor 1 according to the first embodiment. The hollow tubular capacitor 1 includes, as will be later explained, is connected with an inverter circuit portion 6 in parallel to form an inverter device 5 according to the fifth embodiment of the invention. The hollow tubular capacitor 1 is formed by one side electrode connecting portion 2, the other side electrode connecting portion 3 and an electrostatic capacitance portion 4 and has a shape rotationally symmetrical relative to a central axis line AX.

As shown in FIGS. 1 through 4, the one side electrode connecting portion 2 includes an inner peripheral tubular portion 21 of cylindrical shape arranged on the central axis line AX and one side surface portion 22 extending from one end portion (right side end portion as viewed in FIG. 2) of the inner peripheral tubular portion 21 towards the outer periphery side to form an outward flange. The diameter of the other end portion of the inner peripheral tubular portion 21 is reduced to form a smaller diameter connecting portion 23. The other side electrode connecting portion 3 includes an outer peripheral tubular portion 31 of cylindrical shape arranged coaxially with the inner peripheral tubular portion 2 on the central axis line AX and the other side surface portion 32 extending from the other end portion (left side end portion as viewed in FIG. 2) of the outer peripheral tubular portion 31 towards the inner periphery side to form an inward flange. The diameter of the one end portion of the outer peripheral tubular portion 31 is increased to form a large diameter connecting portion 33.

A gap is provided between the outer edge of the one side surface portion 22 of the one side electrode connecting portion 2 and the inner surface of the outer peripheral tubular portion 31 of the other side electrode connecting portion. Also, a gap is provided between the inner edge of the other side surface portion 32 of the other side electrode connecting portion 3 and the outer periphery of the inner peripheral tubular portion 21 of the one side electrode connecting portion 2. By the gaps the one side electrode connecting portion 2 and the other side electrode connecting portion 3 are electrically separated. The one side and the other side electrode connecting portions 2 and 3 are formed by a metal evaporated material or a metal. An annular space S is formed by the inner peripheral tubular portion 21, the one side surface portion 22, the outer peripheral tubular portion 31 and the other side surface portion 32.

The electrostatic capacitance portion 4 is accommodated in the annular space S in a very dense state. As shown in FIG. 5, the electrostatic capacitance portion 40 includes one side electrode plate 41, the other side electrode plate 42 arranged oppositely to the one side electrode plate 41 and two dielectric bodies 43, 43 disposed between the one side electrode plate 41 and the other side electrode plate 42 and is formed to be wound in spiral about the central axis line AX within the annular space S. Further, as shown in FIG. 2, the one side edge 411 of the one side electrode plate 41 is connected to the one side surface portion 22 of the one side electrode connecting portion 2 and at the same time approached by the one side edge 421 of the other side electrode plate 42. Further, the other side edge 412 of the one side electrode plate 41 is approached by the other side surface portion 32 of the other side electrode connecting portion 3 and at the same time is connected to the other side edge 422 of the other side electrode plate 42.

Plates for the one side electrode plate 41 and the other side electrode plate 42 are for example formed by metallizing by metal depositing. It is preferable to use a material with high insulating performance and high permittivity such as plastic film, for the dielectric body 43. These are the material generally used for a conventional winding type capacitor and are not limited to the material described above as an example. A big difference between the conventional winding type capacitor and the capacitor according to the first embodiment is that the inner peripheral tubular portion 21 of the first embodiment includes a hollow portion having an inner diameter D1 inside.

The hollow tubular capacitor 1 is used by connecting the small diameter connecting portion 23 of the one side electrode connecting portion 2 to the positive electrode terminal of the DC power source and the positive electrode terminal of the inverter device and connecting the large diameter connecting portion 33 of the other electrode connecting portion 3 to the negative electrode terminal of the DC power source and the negative electrode terminal of the inverter device. By this connection, the hollow tubular capacitor 1 and the inverter device are connected in parallel with each other relative to the DC power source. Further, considering the safety, the large diameter connecting portion 33 and each negative electrode terminal are grounded.

According to the hollow tubular capacitor 1 of the first embodiment, the inner peripheral tubular portion 21 of the one side electrode connecting portion 2 and the outer peripheral tubular portion 31 of the other side electrode connecting portion 3 are coaxially arranged inside/outside to form a rotational symmetrical shape. Further, the capacitor can be connected to external devices by the annular small diameter connecting portion 23 and the large diameter connecting portion 33. Accordingly, compared to a conventional structure in which the terminals for external devices and conductor elements and the electrode plates for internal connection are arranged in parallel, the structure of the first embodiment can more sufficiently keep the equilibrium property thereby to minimize transferring of the common mode noises. Further, since the inductance component can be reduced, surge voltage level can be minimized which may be generated when the current is interrupted in the parallel arranged inverter device and also transferring of switching noises and radiation of radio noises can be minimized.

Further, since the electrostatic capacitance portion 4 can be highly concentrated in the density of space S without generating any dead space under the winding structure, size red.

Further, the electrostatic capacitance portion 4 can pass a conductor for electric connection through the hollow portion provided inside of the inner peripheral tubular portion 21 or can provide rotation shaft for drive transmission, the freedom of design for installation can be obtained and suitable for a vehicle which needs more space for installation of components. In addition, since the other side electrode connecting portion 3 having the outer peripheral tubular portion 31 can be grounded, the one side electrode connecting portion 2 which generates ground voltage can be sealed to improve the safety.

Figure 6:
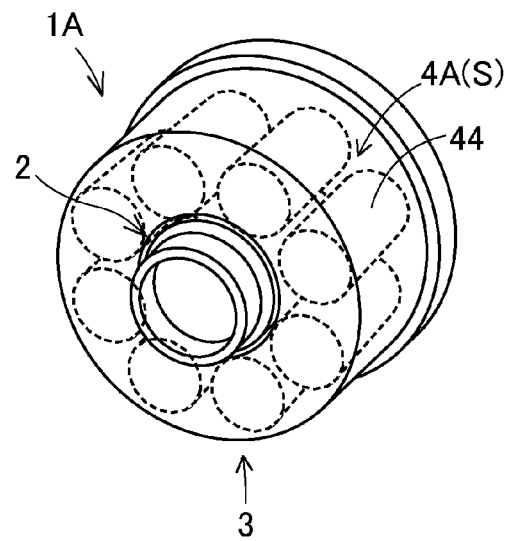
FIG. 6 is a perspective view schematically illustrating a hollow tubular capacitor according to a second embodiment of the invention.
Figure 7:
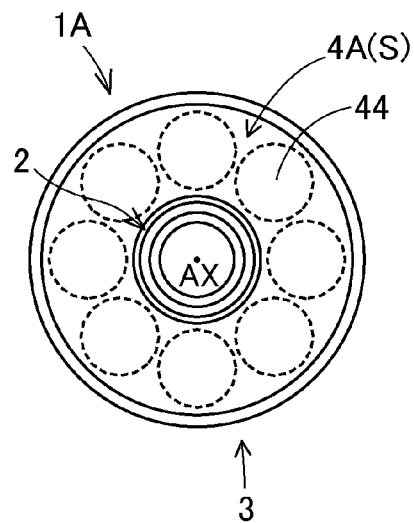
FIG. 7 is a front view of the hollow tubular capacitor according to the second embodiment.

Next, the hollow tubular capacitor according to the second embodiment will be explained hereinafter with reference to FIGS. 6 and 7. The explanation will be mainly made portions which are different from those of the first embodiment. FIG. 6 is a perspective view of schematically illustrated hollow tubular capacitor 1A according to the second embodiment and FIG. 7 is a front view thereof. The hollow tubular capacitor 1A according to the second embodiment uses discrete component and yet is designed to have the same function with the capacitor of the first embodiment. The shapes of the one side electrode connecting portion 2 and the other side electrode connecting portion 3 of the hollow tubular capacitor 1A according to the second embodiment are the same with those of the hollow tubular capacitor 1A according to the first embodiment but the shape of the electrostatic capacitance portion 4A is different from that of the first embodiment.

As shown in FIGS. 6 and 7, the electrostatic capacitance portion 4A is formed by a plurality of (eight in the drawings of this embodiment) capacitor elements 44 tightly arranged within the annular space S about the central axis line AX such that almost all the space S have been occupied by the elements 44. The one side electrode connecting portion 2 is connected to the positive electrode terminal (not shown) of each capacitor element 44 and the other side electrode connecting portion 3 is connected to the negative electrode terminal (not shown) of each capacitor element 44. By this connection arrangement, the capacitor elements are arranged in parallel with one another and the value of electrostatic capacitance of the hollow tubular capacitor 1A exhibits a big value added by the electrostatic capacitance value of each capacitor element 44. It is noted here that although the shape of outer profile and inner structure of each capacitor element 44 are not limited to any particular shape or structure, but it is preferable to form so that the dead space of the inside of the annular space S can be minimized as possible. In order to minimize the dead space, it is possible to combine a plurality of different outer shape capacitor elements of different types.

According to the second embodiment, each of the plurality of capacitor elements 44 may be formed by a winding structured element formed by the one side electrode plate, the other side electrode plate and the dielectric body are wound in spiral about the axis line. In such structure, one side edge of the one side electrode plate of individual capacitor elements is directly connected to the one side surface portion 22 of the one side electrode connecting portion 2 and the other side edge of the other side electrode plate is directly connected to the other side surface 32 of the other side electrode connecting portion 3. Accordingly, the one side surface portion 22 and the other side surface portion 32 can be commonly used for the plurality of capacitor elements thereby to simplify the structure and realize size reduction of the structure.

The plurality of capacitor elements 44 may be accommodated in the annular space S by internally produced winding structure elements or the capacitor elements already in the market may be purchased and suitably accommodated in the space S. The inductance component of the smaller sized capacitor elements 44 is relatively small in value, both in winding type and layered type and accordingly, the hollow tubular capacitor 1A with small inductance component can be comprehensively achieved.

According to the hollow tubular capacitor 1A of the second embodiment, a plurality of capacitor elements 44 is arranged about the central axis line AX within the annular space S and is connected with one another in parallel by the one side electrode connecting portion 2 and the other side electrode connecting portion 3. Thus, the capacitance of the capacitor can be greatly increased and the outer profile as a whole is of hollow cylindrical shape to enable connection to an external device as same as the structure of the first embodiment. Accordingly, the same results as the first embodiment can be obtained.

Figure 8:
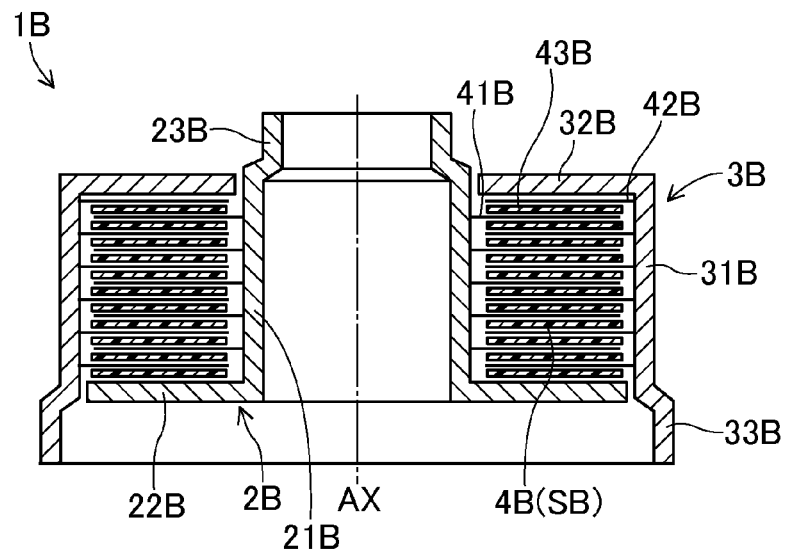
FIG. 8 is a side cross-section view schematically illustrating a hollow tubular capacitor according to a third embodiment of the invention.
Figure 9:
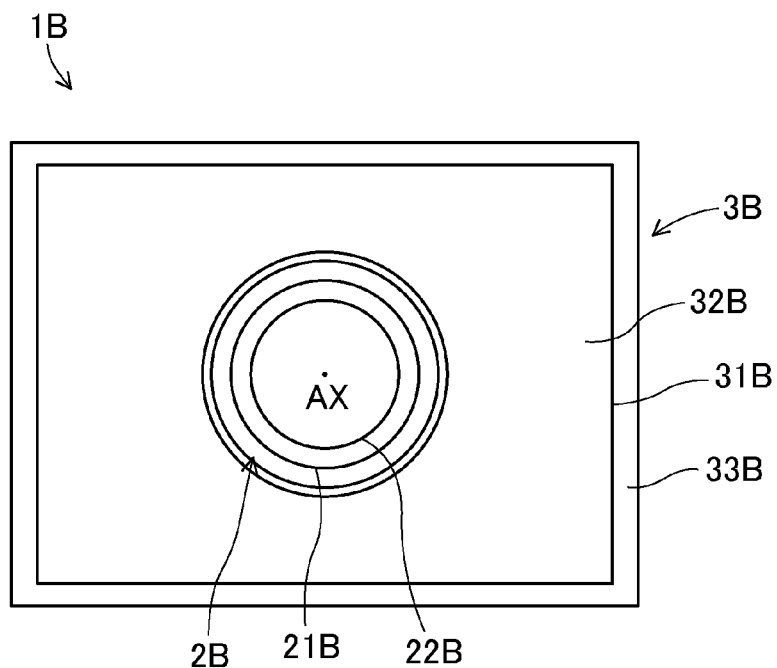
FIG. 9 is a front view of the hollow tubular capacitor according to the third embodiment.

Next, the hollow tubular capacitor according to the third embodiment will be explained hereinafter with reference to FIGS. 8 and 9 and the different points in structure from the first and the second embodiments will be mainly explained. FIG. 8 is a side section view of the schematically illustrated hollow tubular capacitor 1B according to the third embodiment and FIG. 9 is a front view thereof. The hollow tubular capacitor 1B according to the third embodiment has a layered structure and the outer profile is approximately of box shape.

As shown in FIG. 9, the one side electrode connecting portion 2B of this third embodiment includes a cylindrical inner peripheral tubular portion 21B arranged on the central axis line AX and one side surface portion 22B having a rectangular shaped outer edge extending from one end portion of the inner peripheral tubular portion 21B towards the outer periphery side in an outward flange shape. Further, the other side end portion of the inner peripheral tubular portion 21B is formed with a small diameter connecting portion 23B which diameter is reduced. The other side electrode connecting portion 3B includes a square tube shaped outer peripheral tubular portion 31B and the other side surface portion 32B extending from the other end portion of the outer peripheral tubular portion 31B towards the inner periphery side. The one end portion of the outer peripheral tubular portion 31B is enlarged to form a square shaped connecting portion 33B. An annular space SB with a square tubular outer peripheral surface and a cylindrical tubular inner peripheral surface is formed among the inner peripheral tubular portion 21B, the one side surface portion 22B, the outer peripheral tubular portion 31B and the other side surface portion 32B.

The one side electrode plate 41B, the other side electrode plate 42B and the dielectric body 43B forming the electrostatic capacitance portion 4B of the third embodiment are formed to be of annular shape and the inner edge thereof being of circular shape and the outer edge thereof being of square shape. A plurality of one side electrode plates 41B, the plurality of the other side electrode plates 42B and the plurality of dielectric bodies 43B are arranged in layer in the central axis line direction. The one side electrode plates 41B are connected to the outer periphery of the inner peripheral tubular portion 21B and extend to the vicinity of the inner periphery of the outer peripheral tubular portion 32B. The other side electrode plates 42B are alternatively arranged to the one side electrode plates 41B and connected to the inner periphery of the outer peripheral tubular portion 31B and extend to the vicinity of the outer periphery of the inner peripheral tubular portion 21B.

According to the hollow tubular capacitor 1B according to the third embodiment, the inside space of the annular space S can be highly concentrically utilized with almost no dead end space due to the layered structure and therefore, the size reduction and the weight reduction can be practically realized. Further, different from the winding structure as shown in the first embodiment, the inner and outer peripheral tubular portions 21B and 31B are not necessarily formed to be cylindrical and as an example shown in FIG. 5, the box-shaped outer profile can be used by making the outer peripheral tubular portion 31B to be of square shaped tube. This can improve the adaptability of the installation space.

Figure 10:
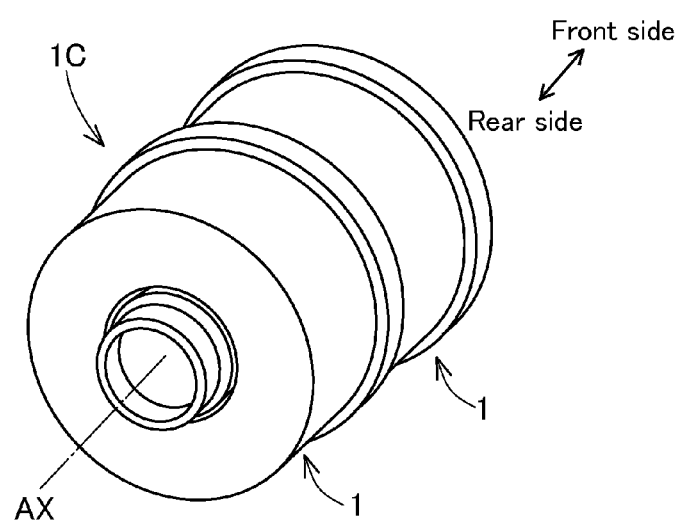
FIG. 10 is a perspective view schematically illustrating a hollow tubular capacitor according to a fourth embodiment of the invention.
Figure 11:
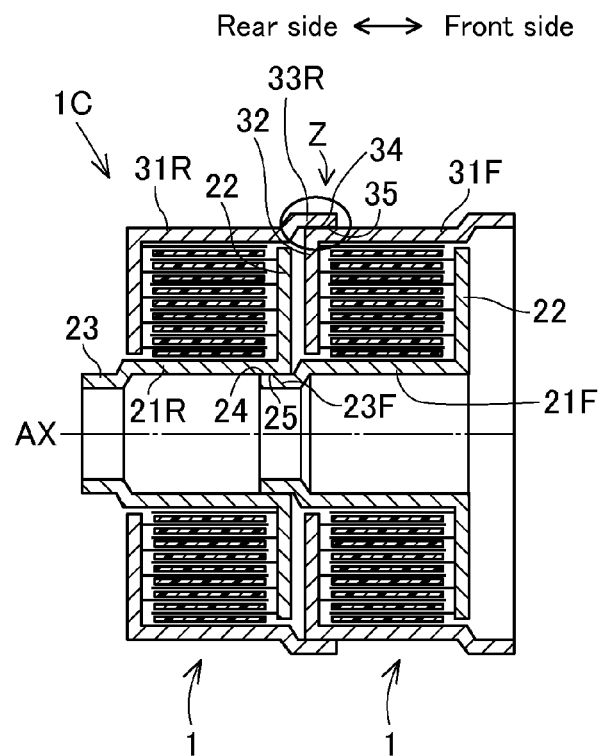
FIG. 11 is a side cross-section view schematically illustrating a hollow tubular capacitor according to the fourth embodiment of the invention.
Figure 12:
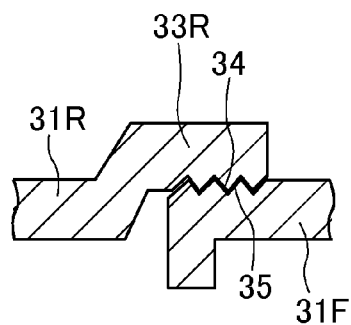
FIG. 12 is an enlarged view of the "Z" portion in FIG. 11 and showing the connection structure by screw engagement.

Next, the hollow tubular capacitor according to the fourth embodiment will be explained hereinafter with reference to FIGS. 10 through 12. The explanation is mainly made to the points different in structure from the previous embodiments 1 through 3. FIG. 10 is a perspective view of the schematically illustrated hollow tubular capacitor 1C of the fourth embodiment and FIG. 11 is a side sectional view thereof. FIG. 12 is an enlarged view of the "Z" portion of FIG. 11 and indicates the screw connection structure. The hollow tubular capacitor 1C according to this fourth embodiment is formed by connecting two hollow tubular capacitors of the first embodiment electrically in parallel connection with each other.

As shown in FIGS. 10 and 11, according to the hollow tubular capacitor 1C according to the fourth embodiment, two capacitors 1 are arranged adjacent to each other at front and rear sides relative to the central axis line AX direction. As shown in FIG. 12, two cylindrical outer peripheral tubular portions 31F and 31R are in screw connection with each other and similarly, two cylindrical inner peripheral tubular portions 21F and 21R are also in screw connection with each other.

It is noted here that the upper right direction as viewed in FIG. 10 and the right side as viewed in FIGS. 11 and 12 are conveniently defined to be the front side. As shown in FIG. 12, a female screw 34 is formed on the inner peripheral surface of the large diameter connecting portion 33R which is the end portion of the one side surface portion side of the rear side outer peripheral tubular portion 31R. On the other hand, a male screw 35 is formed on the outer peripheral surface of the end portion of the other side surface portion 32 side (rear side) of the front side outer peripheral tubular portion 31F. The female screw 34 at the rear side and the male screw 35 at the front side are mutually screwed for connection. Similarly, a female screw 24 is formed on the inner peripheral surface of the end portion of the one side surface portion 22 side (front side) of the rear side inner peripheral tubular portion 21R and on the other hand, a male screw 25 is formed on the outer peripheral surface of the small diameter connecting portion 23F which is the end portion of the other side surface side of the front side inner peripheral tubular portion 21F. The female screw 24 at the rear side and the male screw 25 at the front side are mutually screwed for connection. Accordingly, by aligning the central axis lines of the two hollow tubular capacitors 1 and contacting the two in front and rear sides to relatively rotate the two capacitors, the two capacitors are connected to be in one piece by relative screw advancing movement. At this situation, the two capacitors 1 are electrically connected in parallel with each other by conducting at the two outer and inner screw portions.

According to the hollow tubular capacitor 1C according to the fourth embodiment, since the two hollow tubular capacitors 1 are connected in parallel with each other, the total capacitance becomes approximately twice as much and yet the general shape is of hollow tubular type and the results same as those of the first embodiment can be obtained. Further, since the inner peripheral tubular portions 21F and 21R and the outer peripheral tubular portions 31F and 31R are respectively screwed for connection, the connecting portion can be symmetrical in rotation direction and high equilibrium performance and low inductance can be maintained and at the same time the high frequency impedance can be lowered to be able to achieve a good performance characteristic. Further, since the central axis lines of both front and rear sides hollow tubular capacitors 1 can be automatically aligned by the screw connection, the positioning upon assembling process and the workability in process can be improved.

Figure 13:
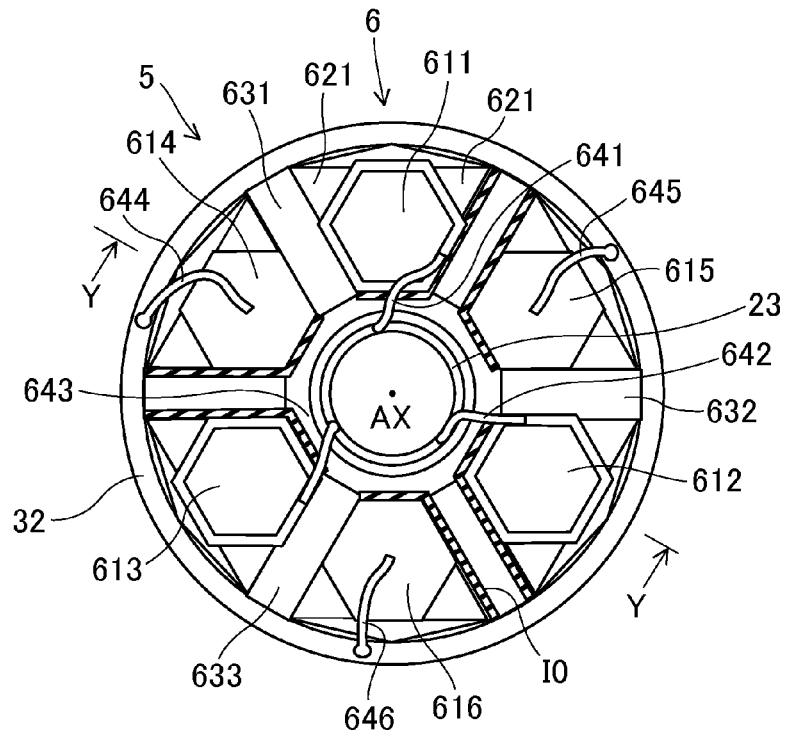
FIG. 13 is a schematic view of an inverter device according to a fifth embodiment and shows a front view seen from the central axis line direction of an inverter circuit portion.
Figure 14:
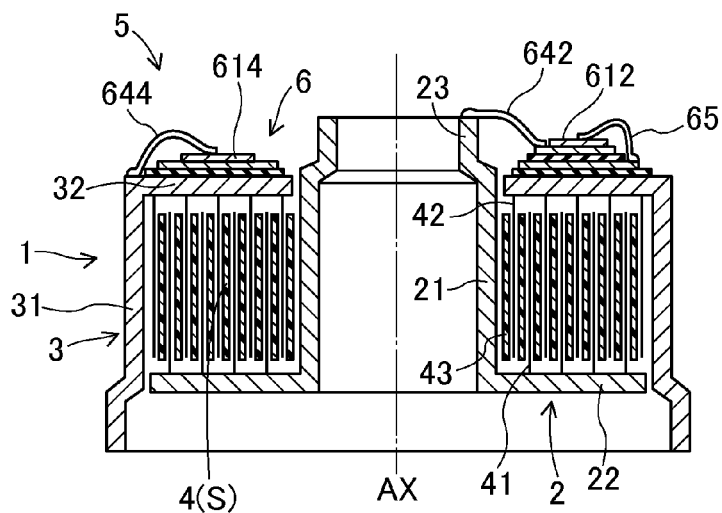
FIG. 14 is a cross section view taken along the arrow line Y-Y in FIG. 13.
Figure 15:
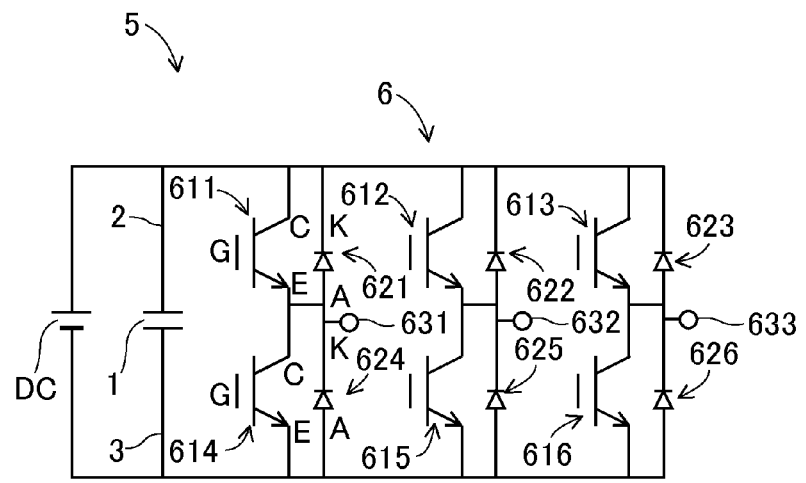
FIG. 15 is a view of a circuit diagram of the inverter device according to the fifth embodiment.
Figure 16:
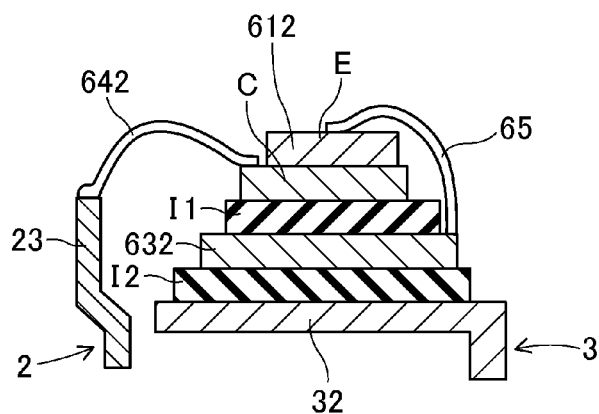
FIG. 16 is an enlarged view of a portion of the inverter circuit portion in FIG. 14.

Next, the inverter device according to the fifth embodiment of the invention will be explained hereinafter with reference to FIGS. 13 through 16. FIG. 13 is a front view of the inverter device 5 according to the fifth embodiment illustrating schematically and showing the front side thereof seen from the central axis line AX direction of the inverter circuit portion 6. FIG. 14 is a cross section view taken along the arrowed line Y-Y of FIG. 13. Further, FIG. 15 is a circuit diagram of the inverter device 5 according to the fifth embodiment and FIG. 16 is a partial enlarged view of a portion of the inverter device 4 in FIG. 14. The inverter device 5 according to the fifth embodiment is formed by the hollow tubular capacitor 1 according to the first embodiment and an annularly formed inverter circuit portion 6 both being formed integrally and arranged coaxially on the central axis line AX. As shown in FIG. 14, the annularly formed inverter circuit portion 6 is arranged to be in contact with the other side surface portion 32 of the other side electrode connecting portion 3 of the hollow tubular capacitor 1.

As shown in FIG. 15, the inverter circuit portion 6 is a generally shaped circuit structure which includes three-phase upper and lower arms and the hollow tubular capacitor 1 is connected thereto arranged in parallel. Each phase upper arm and each phase lower arm are formed by IGBT (Insulated Gate Bipolar Transistor) elements 611 through 616 corresponding to the power semiconductor module and rectifying diodes 621 through 626 corresponding to the semiconductor rectifying elements arranged in parallel with each other.

The collector electrode C (only the electrode of the IGBT element 611 is shown in the drawing) of the IGBT elements 611 through 613 of the upper arm side is connected to the one side electrode connecting portion 2 of the hollow tubular capacitor 1. The emitter electrode E (only the electrode of the IGBT element 611 is shown in the drawing) of the IGBT elements 611 through 613 is connected to the output conductors 631 through 633 as the leg. The anode A (only the anode of the rectifying diode 621 is shown in the drawing) of the rectifying diodes 621 through 623 of the upper arm side is connected to the emitter electrode E of the IGBT elements 611 through 613. The cathode K (only the cathode of the rectifying diode 621 is shown in the drawing) of the rectifying diodes 621 through 623 is connected to the collector electrode C of the IGBT elements 611 through 613.

The collector electrode C (only the electrode of the IGBT element 614 is shown in the drawing) of the IGBT elements 614 through 616 of the lower arm side is connected to the output conductors 631 through 633 as the leg. The emitter electrode E (only the electrode of the IGBT element 614 is shown in the drawing) of the IGBT elements 614 through 616 is connected to the other side electrode connecting portion 3 of the hollow tubular capacitor 1. The anode A (only the anode of the rectifying diode 624 is shown in the drawing) of the rectifying diodes 624 through 626 of the lower arm side is connected to the emitter electrode E of the IGBT elements 614 through 616. The cathode K (only the cathode of the rectifying diode 624 is shown in the drawing) of the rectifying diodes 624 through 626 is connected to the collector electrode C of the IGBT elements 614 through 616. The six gate electrodes G of the six IGBT elements 611 through 616 are connected to the control portion (not shown) and control signals are inputted thereinto.

As shown in FIG. 13, each IGBT element 611 through 616 of the annularly formed inverter circuit portion 6 is formed to be in hexagon shape and arranged with a 60 degree pitch about the central axis line AX. As shown in FIG. 13, the IGBT elements are arranged in series in counter clockwise direction from U-phase upper arm side IGBT element 611, V-phase lower arm side IGBT element 615, V-phase upper arm side IGBT element 612, W-phase lower arm side IGBT element 616, W-phase upper arm side IGBT element 613 and U-phase lower arm side IGBT element 614. Further, the rectifying diodes 621 through 626 of each arm are formed to be of two equilateral triangle shapes and arranged adjacent to the two sides of the hexagon shapes of the IGBT elements 611 through 616 of the respective arms which are closer to the outer periphery (In the drawings, only the rectifying diode 621 is numbered). The output conductors 631 through 633 of each phase are arranged between the upper and lower arms and extending in a radial direction. An insulator 10 is provided between each phase (Indicating the insulator with a bold line hatching for descriptive purposes) to mutually insulate the phases. Each phase is provided within the range of 120 degree about the central axis line AX.

FIG. 16 is an enlarged view of the IGBT element 612 of V-phase upper arm side among the IGBT elements shown in FIG. 14. As shown in FIG. 16, the IGBT element 612 is formed as a layered structure and an emitter electrode E, a collector electrode C, an insulating body 11, a V-phase output conductor 632, an insulating body 12 and the other side surface portion 32 of the other side electrode connecting portion 3 are layered from upper side to the lower side. The gate electrode G is not illustrated in the drawings. The collector electrode C and the small diameter connecting portion 23 of the other side surface portion side of the one side electrode connecting portion 2 are connected by a connecting lead 642 and the emitter electrode E and the V-phase output conductor 632 are connected by a connecting lead 65. Not shown in the drawings, but the V-phase output conductor 632 is also connected to the collector electrode C of the V-phase lower arm side IGBT element 615.

Similarly, the collector electrodes C of the U-phase upper arm side and W-phase upper arm side IGBT elements 611 and 613 are connected to the small diameter connecting portion 23 by connecting leads 641 and 643 (See FIG. 13). On the other hand, the emitter electrodes E of the three-phase lower arm side IGBT elements 614 through 616 and the outer peripheral portion of the other side surface portion 32 side of the outer peripheral tubular portion 31 of the other side electrode connecting portion 3 are connected by the connecting leads 644 through 646 (See FIG. 13). Further, not showing in the drawings, but the U-phase output conductor 631 is connected to the emitter electrode E of the U-phase upper arm side IGBT element 611 and the collector electrode C of the U-phase lower arm side IGBT element 614. Similarly, the W-phase output conductor 633 is connected to the emitter electrode E of the W-phase upper arm side IGBT element 613 and the collector electrode C of the W-phase lower arm side IGBT element 616.

It is noted that the detail inner structure of the inverter circuit portion 6 and the electric performance characteristics thereof are explained in detail in the patent literature 1 referred to in this application in the background art and therefore further explanation thereof is omitted.

The inverter device 5 is used by connecting the small diameter connecting portion 23 of the one side electrode connecting portion 2 of the hollow tubular capacitor 1 with the positive electrode terminal of the DC power source DC and connecting the large diameter connecting portion 33 of the other side electrode connecting portion 3 with the negative electrode terminal of the DC power source DC and further connecting the three-phase output conductors 631 through 633 of the inverter circuit portion 6 with the three-phase load. For example, according to the inverter device 5 installed in the hybrid vehicle, as the DC power source DC, an on-board battery or a voltage increase converter which increases the battery voltage is connected so that a motor for running is connected as the three-phase load. Thus, the control signal is inputted into the gate electrodes G of the IGBT elements 611 through 616 to control the driving of the motor for running.

Further, when the motor for running is used as the generator for regeneration upon braking operation of the hybrid vehicle, the inverter device 5 can be used. In this case, all IGBT elements 611 through 616 are disconnected and the total of six (6) rectifying diodes 621 through 626 form the three-phase full wave rectifying circuit. By this structure, the three-phase electricity inputted to the each phase output conductor 631 through 633 can be converted into the DC electricity to charge the DC power source DC.

According to the inverter device 5 according to the fifth embodiment, the hollow tubular capacitor 1 and the inverter circuit portion 6 are coaxially arranged with respect to the central axis line AX. Further, the inverter circuit portion 6 is arranged to be in contact with the other side electrode connecting portion 3 of the hollow tubular capacitor 1 thereby to shorten the wiring length of the connecting leads 641 through 646 compared to the wiring length of the conventional leads. Due to these overall functions, the total inductance components of the inverter device 5 can be remarkably reduced to minimize the generation of surge voltage and the switching noise. Further, since the hollow tubular capacitor 1 and the inverter circuit portion 6 are formed integrally, the size reduction and the weight reduction can be achieved which improves the adaptability to a vehicle with a very limited installation space.

Figure 17:
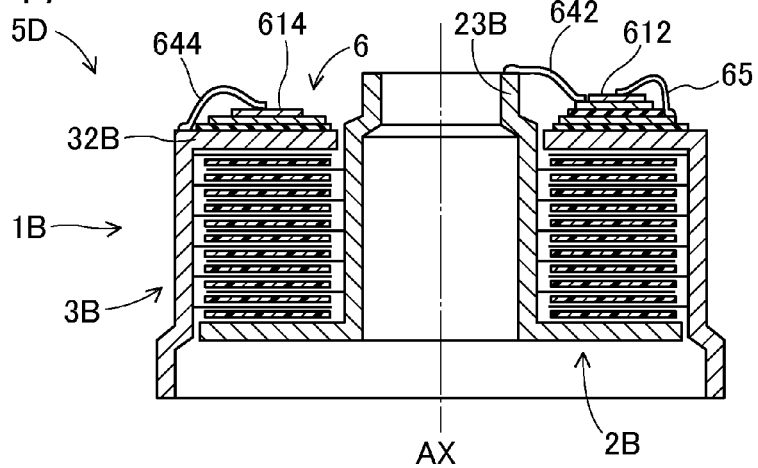
FIG. 17 is a side cross section view schematically illustrating the inverter device according to a sixth embodiment.

The inverter device according to the sixth embodiment will be explained hereinafter with reference to FIG. 17. The explanation is mainly made on the structural differences from the inverter device according to the fifth embodiment. FIG. 17 is a side sectional view of schematically illustrated inverter device 5D according to the sixth embodiment. The inverter device 5D according to the sixth embodiment is formed by the hollow tubular capacitor 1B of the third embodiment and the inverter circuit portion 6 of the fifth embodiment, both being integrally formed and coaxially arranged on the central axis line AX. According to the sixth embodiment, the inverter circuit portion 6 is arranged to be in contact with the other side surface 32B of the other side electrode connecting portion 3B of the hollow tubular capacitor 1B and detail explanation of this structure will be omitted because the structure overlaps with the structure of the fifth embodiment.

According to the inverter device 5D according to the sixth embodiment, the outer profile is determined mostly by the shape of the hollow tubular capacitor 1B. Accordingly, when the shape of the hollow tubular capacitor 1B is formed to be of box-shape and the overall shape of the inverter device 5D is formed to be of box-shape, the adaptability to the vehicle installation space can be improved.

Figure 18:
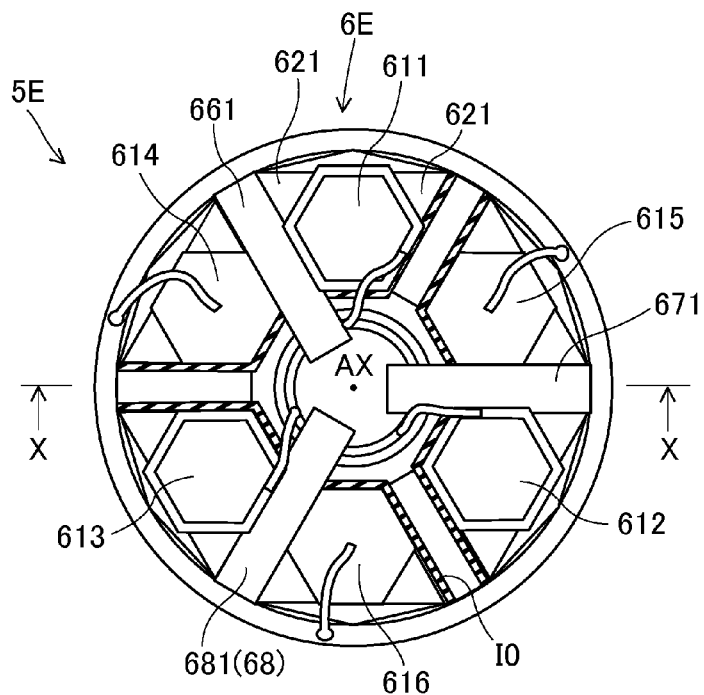
FIG. 18 is a schematic view of an inverter device according to a seventh embodiment and shows a front cross section view seen of an inverter circuit portion.
Figure 19:
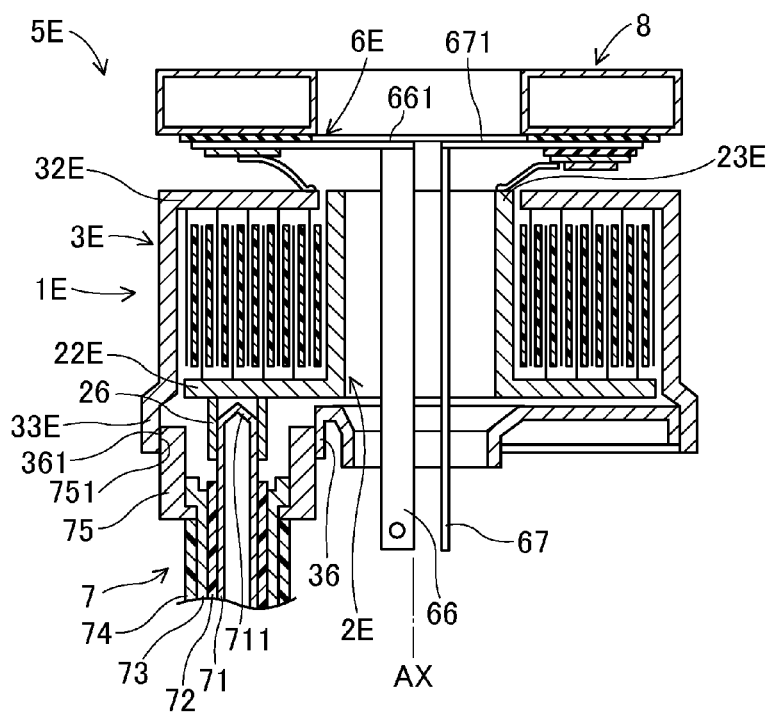
FIG. 19 is cross section view taken along the arrow line X-X in FIG. 17.
Figure 20:
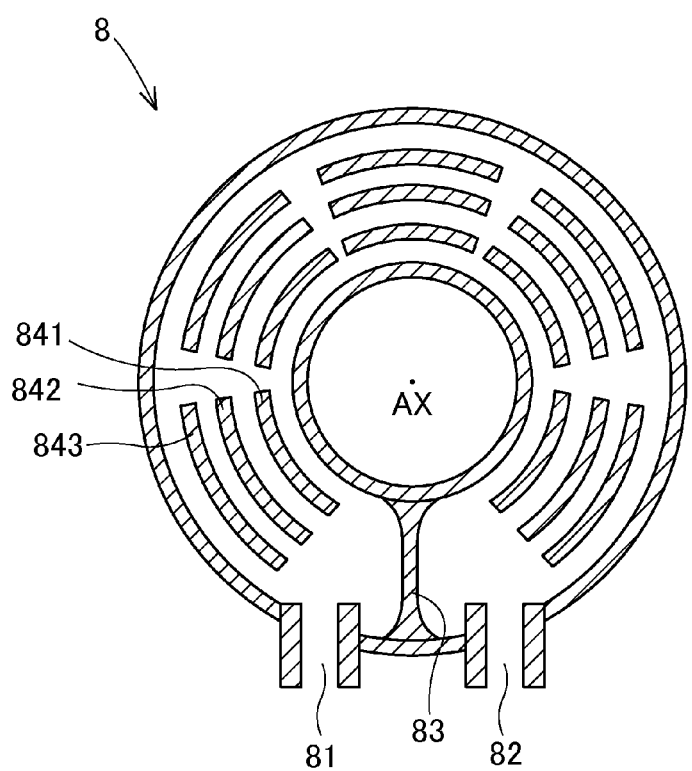
FIG. 20 is a cross section view of a cooling jacket inner structure and showing the view intersecting at a right angle with the central axis line.

Next, the inverter device according to the seventh embodiment will be explained hereinafter with reference to FIGS. 18 through 20. FIG. 18 is a view of the schematically illustrated inverter device 5E according to the seventh embodiment and is a front section view of the inverter circuit portion 6E. FIG. 19 is a cross section view taken along the arrow line X-X of FIG. 18. The inverter device 5E of the seventh embodiment is formed by the hollow tubular capacitor 1E similar to the hollow tubular capacitor 1 of the first embodiment, the inverter circuit portion 6E which layering structure is reversed in up/down direction with respect to the inverter circuit portion of the fifth embodiment, three-phase output conductors 66 through 68, coaxial cable 7 for DC input use and a cooling jacket 8 which corresponds to the cooling portion of the previous embodiments.

The hollow tubular capacitor 1E according to the seventh embodiment has the one side electrode connecting portion 2E and the other side electrode connecting portion 3E which are somewhat different in shape from those of the first embodiment. As shown in FIG. 19, an inner side connecting portion 26 of small diameter and tubular shape is provided at a position apart from the central axis line AX of the outer side surface of the one side surface portion 22E of the one side electrode connecting portion 2E. The small diameter connecting portion 23 of the other side surface portion side of the one side electrode connecting portion 2E is omitted and is connected to the inverter circuit portion 6E at the end portion 23E of the one side surface portion 21E. An outer side connecting portion 36 is provided at the inner periphery side of the large diameter connecting portion 33E of the other side electrode connecting portion 3E and enclosing the inner side connecting portion 26. A female screw 361 is formed on the inner peripheral surface of the outer side connecting portion 36. The inner side connecting portion 26 and the outer side connecting portion 36 have a common axis and arranged at the inner and outer sides relative to the coaxial shaft.

A coaxial cable 7 is connected to the inner side connecting portion 26 and the outer side connecting portion 36. As shown in FIG. 19, the central conductor 71 of the coaxial cable 7 is of hollow tubular shape and the surrounding conductor 73 is provided around the central conductor 71 through an insulator layer 72. The outer peripheral side of the surrounding conductor 73 is further insulated by an insulator layer 74. Upon connecting the coaxial cable 7, a termination process is conducted in advance at one end thereof. In other words, a fit-in terminal portion 711 is formed at the tip end of the central conductor 71 by taper processing to have a tapered tip end. An annular connecting member 75 which is relatively rotatable with and in contact with the surrounding conductor 73 is provided at the tip end of the surrounding conductor 73. The outer peripheral surface of the connecting member 75 is formed with a male screw 751 which engages with the female screw 361.

The one end on which the termination process has been conducted is advanced towards the inner side connecting portion 26 and the outer side connecting portion 36 and is connected thereto by rotating the connecting member 75. Thus, the fit-in terminal portion 711 is press-fitted in the inner peripheral side of the inner side connecting portion 26 thereby to connect the central conductor 71 to the one side electrode connecting portion 2E. The connecting member 75 is engaged with the outer side connecting portion 36 so that the surrounding conductor 73 is connected to the other side electrode connecting portion 3E. At the other end (not shown) of the coaxial cable 7, the central conductor 71 is connected to the positive electrode terminal of the DC power source DC and the surrounding conductor 73 is connected to the negative electrode terminal of the DC power source DC. The type or kind of the coaxial cable 7 is not limited to any particular type or kind and a pair of bus bars which is arranged inside and outside of the coaxial cable is substituted for the coaxial cable.

Further, as shown in FIG. 19, three-phase output conductors 66 through 68 are provided in the hollow portion of the inner peripheral side of the inner peripheral tubular portion 21E of the hollow tubular capacitor 1E and penetrating therethrough. Each one end of the output conductors 66 through 68 is bent outwardly in a radial direction after the hollow tubular capacitor 1E passes through to form the inverter connecting portions 661, 671 and 681. The inverter circuit portion 6E is integrally formed with the inverter connecting portions 661, 671 and 681. The structure of the inverter circuit portion 6E is similar to the structure of the inverter circuit portion 6 of the fifth embodiment and the connection of the hollow tubular capacitor 1E is similar to this. The other end of the lower side of the three-phase output conductors 66 through 68 are connected to the three-phase load such as motor through relay conductor.

The cooling jacket 8 is used for cooling the inverter circuit portion 6E by forcibly circulating the water. The cooling jacket 8 is provided on the central axis line AX and is formed to be of annular shape and has a hollow rectangular shape in cross section in rotation direction. The cooling jacket 8 is fixedly provided on the inverter connecting portions 661, 671 and 681 of the output conductors 66 through 68 at a surface opposite to the location of the inverter circuit portion 6E through an insulating body 13. FIG. 20 is a cross section view of the inner structure of the cooling jacket 8 taken along the line intersecting the central axis line AX at a right angle. As shown in FIG. 20, the cooling jacket 8 includes a water supply port 81 and a water discharge port 82 at a position close to the outer peripheral brim portion. The inner space of the cooling jacket 8 is divided by a radially extending partition wall 83. The water flows in a clockwise direction as viewed in FIG. 20. Further, three flow divider walls 841 through 843 are provided in a peripheral direction to divide the peripheral flowing direction of the cooling water into four directions.

The water supply port 81 and the water discharge port 82 are in fluid communication with a radiator (not shown) and the cooling water circulates by water pump (not shown). The cooling water flows from the water supply port 81 into the inner space of the cooling jacket 8 and flows in a clockwise direction in the jacket 8 and the water is warmed by the heat generated in the inverter circuit portion 6E. The warmed cooling water is discharged from the water discharge port 82 and cooled down again in the radiator. Then thus cooled water is again supplied into the cooling jacket 8 via the water supply port 81.

According to the inverter device 5E according to the seventh embodiment, the following advantages and effects are obtained in addition to the effects obtained from the fifth embodiment. One of such advantages and effects is that further downsizing and weight reduction of the inverter device 5E as a whole can be expected because of the positioning of the three-phase output conductors 66 through 68 in the central portion of the hollow tubular capacitor 5E and the alignment of shape of the cooling jacket 8 which is formed to be in annular shape and provided on the central axis line AX. Further, as another effect of this embodiment is that a further lowering of inductance can be realized because of the connection of the hollow tubular capacitor 1E with the DC power source utilizing the coaxial cable 7 to keep the coaxial cable 7 to have the rotational symmetrical shape which can reduce any influence from floating inductance and floating electrostatic capacitance. It is noted that inductance becomes small as the diameters of the central conductor 71 and the surrounding conductor 73 become large and that the inductance becomes small as the diameter difference between the central conductor 71 and the surrounding conductor 73 becomes small (the insulator layer becomes thinner) when the coaxial cable 7 or a pair of bus bars arranged inner and outer coaxial arrangement.

Figure 21:
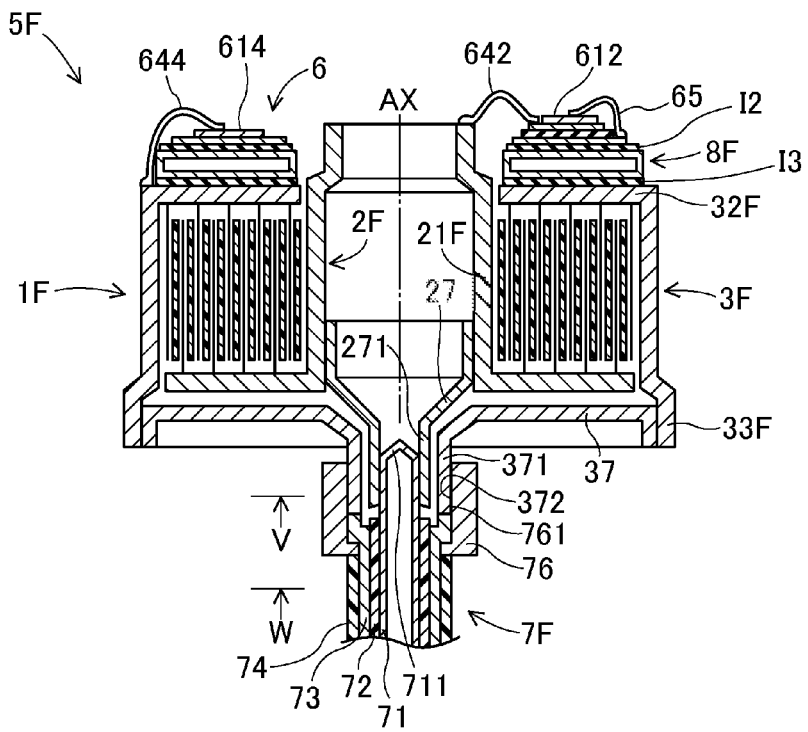
FIG. 21 is a side cross section view of a schematically shown inverter device according to an eighth embodiment of the invention.
Figure 22:
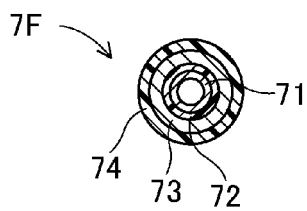
FIG. 22 is across section view of a coaxial cable seen from the arrow W in FIG. 21.
Figure 23:
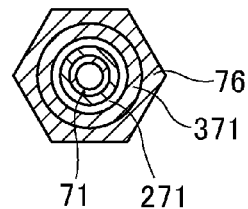
FIG. 23 is a cross section view of the connecting portion of the cable seen from the arrow V in FIG. 21.

Next, the inverter device according to the eighth embodiment will be explained with reference to FIG. 21. FIG. 21 is a side cross section view of schematically illustrated inverter device 5F according to the eighth embodiment. FIG. 22 is a cross section view of the coaxial cable 7 seen from the arrow W in FIG. 21 and FIG. 23 is a cross section view of the cable connecting portion seen from the arrow V in FIG. 21. According to the inverter device 5F according to the eighth embodiment, the coaxial cable 7F is connected to the inverter device 5F on the central axis line AX of the hollow tubular capacitor 1F and accordingly, the shapes of the one side electrode connecting portion 2F and the other side electrode connecting portion 3F are different from those of the other embodiments 1 through 7.

As shown in FIG. 21, an inner taper member 27 is provided on the inner peripheral surface of the inner peripheral tubular portion 21F of the one side electrode connecting portion 2F. The diameter of the inner taper member 27 is gradually reduced in downward as viewed in FIG. 21 to form a tapered portion. The tip end of the taper member 27 is formed to be an inner side connecting portion 271 having a tubular shape and a fixed diameter size. Further, an outer taper member 37 is provided on the inner peripheral surface of the large diameter connecting portion 33F of the other side electrode connecting portion 3F. The diameter of the outer taper member 37 is gradually reduced in radially inward direction and then is reduced gradually separated from but in parallel with the inner side taper member 27. The tip end of the taper member 37 is formed to be an outer side connecting portion 371 having a tubular shape and a fixed diameter size. A male screw 372 is provided on the outer peripheral surface of the outer side connecting portion 371. The inner side connecting portion 271 and the outer side connecting portion 371 are arranged inner and outer coaxial arrangement commonly having the central axis line AX.

The coaxial cable 7F is similar to the coaxial cable 7 of the seventh embodiment. As shown in FIG. 22, the coaxial cable 7F is layered in four layers, the central conductor 71 layer, insulator layer 72, surrounding conductor layer 73 and insulator layer 74. Upon connection of the coaxial cable 7, the one end of the cable is conducted a terminal processing as similar to the seventh embodiment. However, the structure of connecting portion is different from that of the seventh embodiment. In more detail, the tip end of the central conductor 71 is processed to have a thin diameter to form a press-fit terminal 711. A relatively rotatable annular connecting nut 76 is provided at the tip end of the surrounding conductor 73 and is arranged to be in contact with the surrounding conductor 73. The rear side of the inner peripheral surface of the connecting nut 76 is in contact with the surrounding conductor 73 and a female screw 76 is provided on the front side of the inner peripheral surface for engaging with the male screw 372 of the outer side connecting portion 371. The outer peripheral surface of the connecting nut 76 has a hexagon shape as viewed in FIG. 23 and is rotated by a wrench.

The one end of the coaxial cable 7F on which the termination process has been conducted is advanced towards the inner side connecting portion 271 and the outer side connecting portion 371 and is connected thereto by rotating the connecting nut 76. Thus, the fit-in terminal portion 711 is press-fitted in the inner peripheral side of the inner side connecting portion 271 thereby to connect the central conductor 71 to the one side electrode connecting portion 2F. The connecting nut 76 is engaged with the outer side connecting portion 371 so that the surrounding conductor 73 is connected to the other side electrode connecting portion 3F. At the other end (not shown) of the coaxial cable 7F, the central conductor 71 is connected to the positive electrode terminal of the DC power source DC and the surrounding conductor 73 is connected to the negative electrode terminal of the DC power source DC.

Further, as viewed in FIG. 21, the cooling jacket 8F corresponding to the cooling portion is provided between the other side surface portion 32F of the other side electrode connecting portion 3F and the inverter circuit portion 6 through insulating bodies 12 and 13. The cooling jacket 8F includes an inner annular space, wider in a radial direction and narrower in an axial direction to directly cool down the inverter circuit portion 6.

According to the inverter device 5F of the eighth embodiment, positive and negative conductors are consistently inner and outer coaxially arranged between the DC power source and the hollow tubular capacitor 1F. Accordingly, the positive and negative currents are mutually cancelled theoretically and no induction noise or electric wave noise are generated or if generated such amount is very small in amount.

Figure 24:
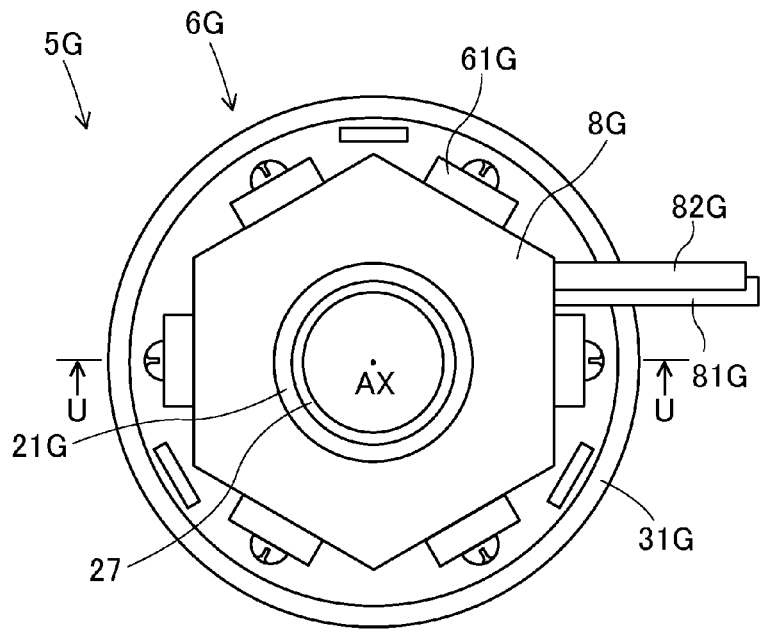
FIG. 24 is a schematic view of an inverter device according to a ninth embodiment and shows a front view seen from the central axis line direction of an inverter circuit portion.
Figure 25:
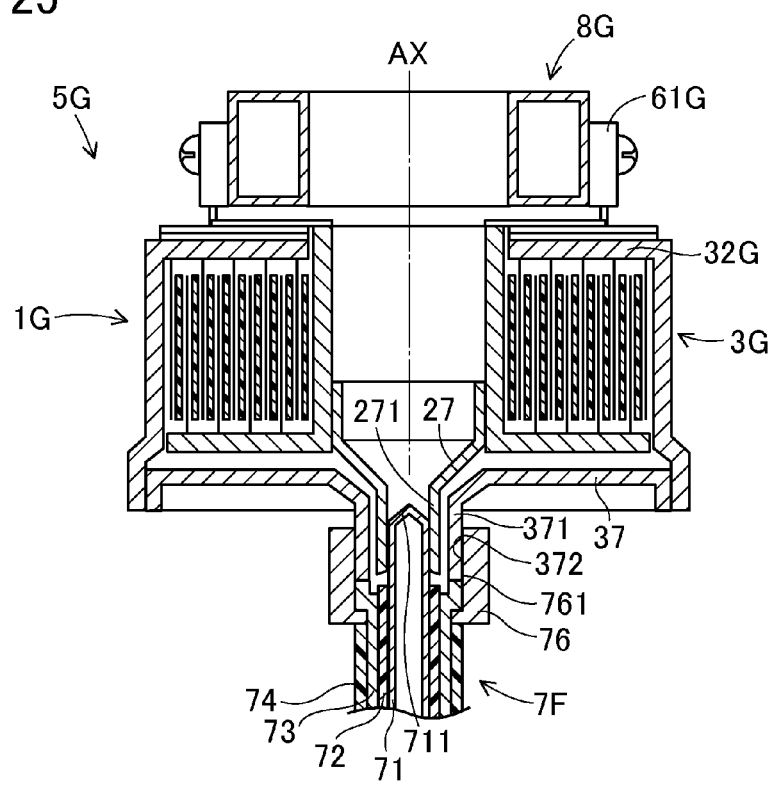
FIG. 25 is a cross section view taken along the arrow line U-U in FIG. 24.

Next, the inverter device according to the ninth embodiment will be explained hereinafter with reference to FIGS. 24 and 25. FIG. 24 is a view of schematically illustrated inverter device 5G according to the ninth embodiment and shows a front view of the inverter circuit portion 6G from the central axis line AX direction. FIG. 25 is a cross section view taken along the line U-U arrow in FIG. 24. The inverter device 5G according to the ninth embodiment has the IGBT element 61G of the inverter circuit portion 5G which is different in shape and arrangement from those in the embodiments fifth through eighth. The cooling jacket 8G is also different in shape but the connection of the coaxial cable 7F on the central axis line AX is the same with the connection in the eighth embodiment.

As viewed in FIG. 24, the inverter device 5G according to the ninth embodiment has six (6) IGBT elements 61G on the side surface of the other side surface portion 32G of the other side electrode connecting portion 3G of the hollow tubular capacitor 1G with a pitch of 60 degrees in circumferential direction. The six IGBT elements are arranged in an axial line direction. The cooling jacket 8G is arranged on the central axis line AX at the inner side of the IGBT elements 61G. The cooling jacket 8G is of a hollow annular shape having hexagonal columnar outer peripheral surfaces and cylindrical inner peripheral surfaces. The six IGBT elements 61G are closely attached to the six outer peripheral surfaces, respectively. The cooling jacket 8G includes the water supply port 81G, water discharge port 82G, radiator (not shown) and water pump (not shown) and circulates the cooling water inside to cool off the IGBT elements 61G.

According to the inverter device 5G of the ninth embodiment, the present invention can be used utilizing a power semiconductor module other than the IGBT elements disclosed in the patent literature 1, for example, a marketed product and therefore, the applicability is wider than the other embodiments.

Figure 26:
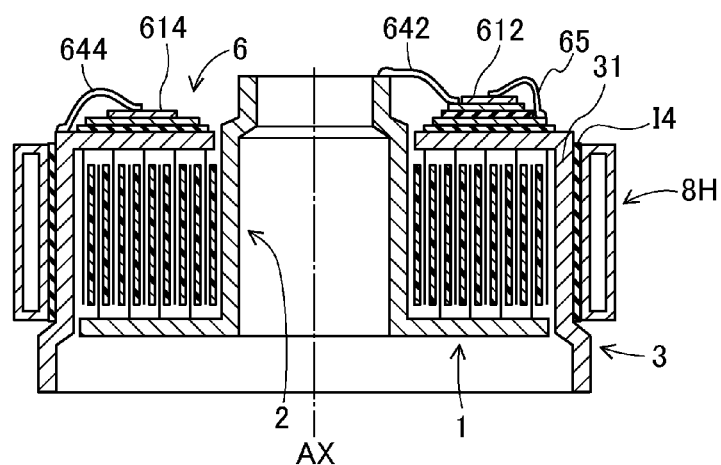
FIG. 26 is a cross section view, showing a first modification of the cooling portion which cools the inverter circuit portion.
Figure 27:
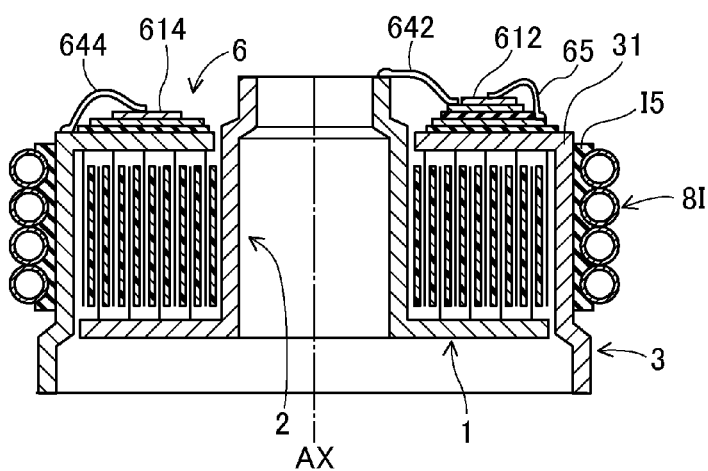
FIG. 27 is a cross section view, showing a second modification of the cooling portion which cools the inverter circuit portion.

Next, variation of the cooling portion will be explained hereinafter with reference to FIGS. 26 and 27. FIGS. 26 and 27 are cross section views of the cooling portion of a first variation and a second variation which cool down the inverter circuit portion 6. The first variation of FIG. 26 shows a cooling jacket 8H which corresponds to the cooling portion. The cooling jacket 8H is provided on the outer peripheral surface of the outer peripheral tubular portion 31 of the other side electrode connecting portion 3 through an insulating body 14. The cooling jacket 8H has an annular inner space extending slightly in a radial direction and largely in an axial line direction. The second variation of the cooling portion in FIG. 27 is a cooling tube 8I which corresponds to the cooling portion and is formed to be of spiral shape on the outer peripheral tubular portion 31 of the other side electrode connecting portion 3 through an insulating body 15. The cooling jacket 8H and the cooling tube 8I cool down the other side electrode connecting portion 3 thereby to indirectly cool down the inverter circuit portion 6 arranged adjacent to the other side electrode connecting portion 3.

According to a first aspect of the embodiment of the invention, a hollow tubular capacitor 1 connected in parallel with an inverter circuit portion, includes one side electrode connecting portion 2 having an inner peripheral tubular portion 21 and one side surface portion 22 extending from one end portion of the inner peripheral tubular portion toward an outer peripheral side; the other side electrode connecting portion 3 having an outer peripheral tubular portion 31 arranged coaxially with the inner peripheral tubular portion 21 on a central axis line (AX) and the other side surface portion 32 extending from the other end portion of the outer peripheral tubular portion 31 toward an inner peripheral side; and an electrostatic capacitance portion 4 having one side electrode plate 41 connected to the one side electrode connecting portion 2, the other side electrode plate 42 arranged oppositely to the one side electrode plate 41 and connected to the other side electrode connecting portion 3 and a dielectric body disposed between the one side electrode plate 41 and the other side electrode plate 42. According to the hollow tubular capacitor according to this aspect, the electrostatic capacitance portion 4 is accommodated in a high density in an annular space (S) formed by the inner peripheral tubular portion 21, the one side surface portion 22, the outer peripheral tubular portion 31 and the other side surface portion 32.

According to the hollow tubular capacitor of the first aspect, since the inner peripheral tubular portion 21 of the one side electrode connecting portion 2 and the outer peripheral tubular portion 31 of the other side electrode connecting portion 3 are arranged coaxially inner side and outer side, the structure becomes rotationally symmetrical and provides a good equilibrium property thereby to prevent transferring of common mode noises. Further, since the internal inductance component can be reduced more compared to the conventional structure, a voltage level of surge voltage generated when the electric current is interrupted in the inverter device connected in parallel with the capacitor can be minimized and therefore, the transferring of switching noises and radiation of radio noises can be minimized. This can reduce the electromagnetic environmental influence on the adjacently arranged electronic control devices and the various sensors. Still further, since the conductor for electric connection can be inserted into the hollow portion or a rotational shaft for transmitting driving power can be provided, a large freedom of design in arranging components can be obtained and is easy to be used. It is suitable for a use in a vehicle which has a very limited space for installing components. Further, by grounding the other side electrode connecting portion having the outer peripheral tubular portion, the one side electrode connecting portion can be easily electrically sealed to prevent generation of ground voltage, which leads to an improvement in safety.

The hollow tubular capacitor according to a second aspect, the one side electrode plate 41, the other side electrode plate 42 arranged oppositely to the one side electrode plate 41 and the dielectric body 43 disposed between the one side electrode plate 41 and the other side electrode plate 42 of the electrostatic capacitance portion 4 are formed to be wound in spiral about the central axis line AX in the annular space (S) and wherein one side edge of the one side electrode plate is connected to one of the one side surface portion 22 of the one side electrode connecting portion 2 and the other side surface portion 32 of the other side electrode connecting portion 3 thereby to approximate one side edge of the other side electrode plate and the other side edge of the one side electrode plate is approximated by the other of the one side surface portion 22 of the one side electrode connecting portion 2 and the other side surface portion 32 of the other side electrode connecting portion 3 thereby to connect the other side edge of the other side electrode plate therewith.

According to the second aspect, since the electrostatic capacitance portion 4 is formed by winding the one side electrode plate 41, the other side electrode plate 42 and the dielectric body 43 in spiral, the inside of the annular space (S) can be effectively used without any dead space and with high density. This can realize a large size reduction and large weight reduction.

According to a third aspect of the invention, the hollow tubular capacitor 1 includes the electrostatic capacitance portion 4 formed by a plurality of capacitor elements 4 arranged within the annular space (S) about the central axis line (AX) and each positive electrode terminal of each of the plurality of capacitor elements 4 is connected to one of the one side electrode connecting portion 2 and the other side electrode connecting portion 3, while each negative electrode terminal of the each of the plurality of capacitor elements is connected to the other of the one side electrode connecting portion and the other side electrode connecting portion.

According to the third aspect of the invention, since the plurality of capacitor elements 4 is disposed within the annular space (S) about the central axis line (AX) and is connected in parallel arrangement at the one side electrode connecting portion 2 and the other side electrode connecting portion 3, a large amount of capacitor capacitance can be realized and the shape is formed to be as a hollow tubular shape as a whole. This can achieve the same effects achieved by the structure of the first aspect above.

The hollow tubular capacitor according to a fourth aspect of the invention, the plurality of capacitor elements 4 is formed such that the one side electrode plate 41, the other side electrode plate 42 arranged oppositely to the one side electrode plate and the dielectric body 43 disposed between the one side electrode plate 41 and the other side electrode plate 42 are formed to be wound in spiral about an axial line and that one side edge of the one side electrode plate of the each of the plurality of capacitor elements 4 is connected to one of the one side surface portion of the one side electrode connecting portion 2 and the other side surface portion 32 of the other side electrode connecting portion 3, thereby to approximate one side edge of the other side electrode plate 42 and the other side edge of the one side electrode plate 41 is appropriated by the other of the one side surface portion 22 of the one side electrode connecting portion 2 and the other side surface portion 32 of the other side electrode connecting portion 3 thereby to connect the other side edge of the other side electrode plate 42 therewith.

According to the fourth aspect of the invention, since the plurality of capacitor elements 4 is structured to be a winding shape and the one side surface portion 22 of the one side electrode connecting portion 2 and the other side surface portion 32 of the other side electrode connecting portion 3 can be commonly used, the structure as a whole can be simplified to achieve a large size reduction and a large weight reduction.

The hollow tubular capacitor 1 according a fifth aspect of the invention includes the electrostatic capacitance portion 4 which includes a plurality of annular one side electrode plates 41B connected to an outer periphery of the inner peripheral tubular portion 21B and extending adjacent to an inner periphery of the outer peripheral tubular portion 31B, a plurality of the annular other side electrode plates 42 arranged alternately with the plurality of the annular one side electrode plates, connected to an inner periphery of said the outer peripheral tubular portion 31B and extending adjacent to an outer periphery of the inner peripheral tubular portion 21B and a plurality of dielectric bodies 43B disposed between the plurality of the annular one side electrode plates 41B and the plurality of the annular the other side electrode plates 43B.

According to the fifth aspect of the invention, since the electrostatic capacitance portion 4 is formed to be an accumulated layer structure wherein the plurality of one side electrode plates 41B and the plurality of the other side electrode plates 42B and the dielectric bodies 43 are layered, the inside of the annular space (SB) can be effectively used without leaving any unused area to realize the size and weight reduced structure. Further, different from the structure of winding as noted in the second aspect, the inner peripheral and outer peripheral tubular portions 21B, 22B are not necessarily formed to be of cylindrical shape. For example, the shape of the outer peripheral tubular portion can be modified to be a box-shape to have a box shaped outer profile. This can improve the adaptability to the shape of installation space.

The hollow tubular capacitor 1 according to a sixth aspect of the invention includes a plurality of hollow tubular capacitors 1, 1A, 1B, 1C, 1E, 1F, 1G arranged in front and rear direction relative to the central axis line (AX) direction neighboring one another and the one end portion of the one side surface portion 22 side of a rear side of the inner peripheral tubular portion 21 of the mutually neighboring hollow tubular capacitors connected to the one end portion of the other side surface portion 32 side of a front side of the inner peripheral tubular portion 21 of the mutually neighboring hollow tubular capacitors, while the one end portion of the one side surface portion 22 side of a rear side of the outer peripheral tubular portion 31 of the mutually neighboring hollow tubular capacitors being connected to the one end portion of the other side surface portion 32 side of the front side of the outer peripheral tubular portion 31 of the mutually neighboring hollow tubular capacitors.

According to the sixth aspect of the invention, since the plurality of hollow tubular capacitors 1, 1A, 1B, 1C, 1E, 1F, 1G is arranged neighboring one another at front and rear portions relative to the central axis line (AX) and the inner peripheral tubular portions 21B, 21F, 21R or the outer peripheral tubular portions 31B, 31R are electrically connected in parallel with each other, a large amount of capacitance can be generated and the shape as a whole is formed to be of hollow tubular shape and the effects obtained by the structure of the first aspect can be also obtained here.

The hollow tubular capacitor according to a seventh aspect of the invention is characterized in that the inner peripheral tubular portion 21B, 21F, 21R and the outer peripheral tubular portion 31B, 31R are of cylindrical shape and a female screw 34 formed at the end portion of the one side surface portion side of the rear side of inner peripheral tubular portion is screwed with a male screw 35 formed at the end portion of the other side surface portion side of the front side of inner peripheral tubular portion 21B, 21F, 21R, while a female screw 361 formed at the end portion of the one side surface portion side of the rear side of outer peripheral tubular portion is screwed with a male screw 751 formed at the end portion of the other side surface portion side of the front side of outer peripheral tubular portion.

According to the seventh aspect of the invention, since the cylindrically shaped inner peripheral tubular portions or the outer peripheral tubular portions as defined in the sixth aspect are connected with each other through screw connection 34, 35, the connecting portion is rotationally symmetrical to improve equilibrium property and keep low inductance. This also keeps the high frequency wave impedance to be low to improve the performance characteristics. Further, by connecting through screws 34, 35, each central axis line of the plurality of hollow tubular capacitors is automatically aligned to improve the workability of assembling process in manufacturing.

An inverter device 5, 5D, 5E, 5F, 5G according to an eighth aspect of the invention includes the hollow tubular capacitor 1 defined in any one of the aspects 1 through 7 of the invention above, an inverter circuit portion 6, 6E formed in annular shape about the central axis line (AX) and coaxially and integrally formed with the hollow tubular capacitor 1 and having a three phase upper arm and a three phase lower arm connected to a DC power source DC and respectively including the power semiconductor module (IGBT elements) for controlling the energization phase, each leg between the three phase upper and lower arms being connected to a three phase load, wherein the one side electrode connecting portion 2, 2B, 2E, 2F and the other side electrode connecting portion 3, 3B, 3E, 3F, 3G of the hollow tubular capacitor are electrically connected to the three phase upper and lower arms of the inverter circuit portion 6, 6E.

The inverter device according to the eighth aspect of the invention includes the hollow tubular capacitor as defined in any of the first to seventh aspect of the invention and the annularly formed inverter circuit portion 6, 6E are coaxially arranged with respect to the central axis line. Accordingly, the inductance component in the inverter device 5 as a whole can be reduced and the surge voltage and the switching noises can be minimized thereby. Further, since the hollow tubular capacitor 1 and the inverter circuit portion 6, 6E are integrally formed, a size reduction as well as a weight reduction can be achieved to be suitable for a use in a vehicle which has a severe space limitation.

The inverter device according to a ninth aspect of the invention includes the inverter circuit portion 6, 6E disposed in contact with the one side electrode connecting portion 2 or the other side electrode connecting portion 3 of the hollow tubular capacitor 1.

According to the ninth aspect of the invention, the inverter circuit portion 6, 6E is arranged in contact with the one side electrode connecting portion or the other side electrode connecting portion of the hollow tubular capacitor. This can shorten the wire length necessary for electric connection and more improvement in reducing the inductance can be achieved.

The inverter device according to a tenth aspect of the invention further includes a three phase output conductor 68 which penetrates through the inner peripheral side of the inner peripheral tubular portion 21 of the hollow tubular capacitor 1 and connects the legs with the three phase load.

According to the tenth aspect of the invention, the three phase output conductor is arranged at a central hollow portion of the hollow tubular capacitor 1 and accordingly, the size and the weight of the entire inverter device can be reduced.

The inverter device according to an eleventh aspect of the invention further includes a coaxial cable 7 or a pair of bus bars arranged coaxially with inner/outer side which connects the one side electrode connecting portion 2 or the other side electrode connecting portion 3 of the hollow tubular capacitor 1 with the DC power source DC.

According to the eleventh aspect of the invention, the hollow tubular capacitor is connected to the DC power source through the coaxial cable 7, 7F or a pair of bus bars co-axially arranged inside and outside. Accordingly, the rotationally symmetrical shape can be maintained by the coaxial cable and the bus bars to keep the equilibrium property. Thus the floating inductance or floating electrostatic capacitance can be minimized to improve further the inductance reduction.

The inverter device according to a twelfth aspect of the invention further includes an annular cooling portion 8, 8F, 8G, 8H on the central axis line for cooling down the inverter circuit portion 6, 6E.

According to the twelfth aspect of the invention, since the cooling portion 8, 8G, 8H is formed to be of annular shape and provided on the central axis line, the shape is organized to notably improve the size reduction and the weight reduction of the inverter device as a whole."

The invention claimed is:

1. A hollow tubular capacitor connected in parallel with an inverter circuit portion, including:
    a one side electrode connecting portion having an inner peripheral tubular portion and a one side surface portion extending from a one end portion of the inner peripheral tubular portion toward an outer peripheral side;
    an other side electrode connecting portion having an outer peripheral tubular portion arranged coaxially with the inner peripheral tubular portion on a central axis line and an other side surface portion extending from an other end portion of the outer peripheral tubular portion toward an inner peripheral side; and
    an electrostatic capacitance portion having a one side electrode plate connected to the one side electrode connecting portion, an other side electrode plate arranged oppositely to the one side electrode plate and connected to the other side electrode connecting portion and a dielectric body disposed between the one side electrode plate and the other side electrode plate, wherein
    the electrostatic capacitance portion is accommodated in a high density in an annular space formed by the inner peripheral tubular portion, the one side surface portion, the outer peripheral tubular portion and the other side surface portion;
    wherein the hollow tubular capacitor includes a plurality of hollow tubular capacitors arranged in front and rear direction relative to the central axis line direction neighboring one another and the one end portion of the one side surface portion side of a rear side of the inner peripheral tubular portion of the mutually neighboring hollow tubular capacitors is connected to the one end portion of the other side surface portion side of a front side of the inner peripheral tubular portion of the mutually neighboring hollow tubular capacitors, while the one end portion of the one side surface portion side of a rear side of the outer peripheral tubular portion of the mutually neighboring hollow tubular capacitors is connected to the one end portion of the other side surface portion side of the front side of the outer peripheral tubular portion of the mutually neighboring hollow tubular capacitors.

2. The hollow tubular capacitor according to claim 1, wherein the inner peripheral tubular portion and the outer peripheral tubular portion are of cylindrical shape and a female screw formed at the end portion of the one side surface portion side of the rear side of inner peripheral tubular portion is screwed with a male screw formed at the end portion of the other side surface portion side of the front side of inner peripheral tubular portion, while a female screw formed at the end portion of the one side surface portion side of the rear side of outer peripheral tubular portion is screwed with a male screw formed at the end portion of the other side surface portion side of the front side of outer peripheral tubular portion.

3. An inverter device including:
    a hollow tubular capacitor connected in parallel with an inverter circuit portion, including:
    a one side electrode connecting portion having an inner peripheral tubular portion and a one side surface portion extending from a one end portion of the inner peripheral tubular portion toward an outer peripheral side;
    an other side electrode connecting portion having an outer peripheral tubular portion arranged coaxially with the inner peripheral tubular portion on a central axis line and an other side surface portion extending from an other end portion of the outer peripheral tubular portion toward an inner peripheral side; and
    an electrostatic capacitance portion having a one side electrode plate connected to the one side electrode connecting portion, an other side electrode plate arranged oppositely to the one side electrode plate and connected to the other side electrode connecting portion and a dielectric body disposed between the one side electrode plate and the other side electrode plate, wherein
    the electrostatic capacitance portion is accommodated in a high density in an annular space formed by the inner peripheral tubular portion, the one side surface portion, the outer peripheral tubular portion and the other side surface portion; and
    an inverter circuit portion formed in annular shape about the central axis line and coaxially and integrally formed with the hollow tubular capacitor and having a three phase upper arm and a three phase lower arm connected to a DC power source and respectively including a power semiconductor module for controlling an energization phase, each leg between the three phase upper and lower arms being connected to a three phase load, wherein the one side electrode connecting portion and the other side electrode connecting portion of the hollow tubular capacitor are electrically connected to the three phase upper and lower arms of the inverter circuit portion.

4. The inverter device accordin to claim 3, wherein the one side electrode plate, the other side electrode plate arranged oppositely to the one side electrode plate and the dielectric body disposed between the one side electrode plate and the other side electrode plate of the electrostatic capacitance portion are formed to be wound in spiral about the central axis line in the annular space and wherein a one side edge of the one side electrode plate is connected to one of the one side surface portion of the one side electrode connecting portion and the other side surface portion of the other side electrode connecting portion thereby to approximate a one side edge of the other side electrode plate and an other side edge of the one side electrode plate is approximated by the other of the one side surface portion of the one side electrode connecting portion and the other side surface portion of the other side electrode connecting portion thereby to connect an other side edge of the other side electrode plate therewith.

5. The inverter device according to claim 3, wherein the electrostatic capacitance portion is formed by a plurality of capacitor elements arranged within the annular space about the central axis line and each positive electrode terminal of each of the plurality of capacitor elements is connected to one of the one side electrode connecting portion and the other side electrode connecting portion, while each negative electrode terminal of the each of the plurality of capacitor elements is connected to the other of the one side electrode connecting portion and the other side electrode connecting portion.

6. The inverter device according to claim 3, wherein the plurality of capacitor elements is formed such that the one side electrode plate, the other side electrode plate arranged oppositely to the one side electrode plate and the dielectric body disposed between the one side electrode plate and the other side electrode plate are formed to be wound in spiral about the central axis line and that one side edge of the one side electrode plate of the each of the plurality of capacitor elements is connected to one of the one side surface portion of the one side electrode connecting portion and the other side surface portion of the other side electrode connecting portion, thereby to approximate the one side edge of the other side electrode plate and the other side edge of the one side electrode plate is appropriated by the other of the one side surface portion of the one side electrode connecting portion and the other side surface portion of the other side electrode connecting portion thereby to connect the other side edge of the other side electrode plate therewith.

7. The inverter device according to claim 3, wherein the electrostatic capacitance portion includes a plurality of annular one side electrode plates connected to an outer periphery of the inner peripheral tubular portion and extending adjacent to an inner periphery of the outer peripheral tubular portion, a plurality of the annular other side electrode plates arranged alternately with the plurality of the annular one side electrode plates, connected to an inner periphery of said the outer peripheral tubular portion and extending adjacent to an outer periphery of the inner peripheral tubular portion and a plurality of dielectric bodies disposed between the plurality of the annular one side electrode plates and the plurality of the annular the other side electrode plates.

8. The inverter device according to claim 3, wherein the inverter circuit portion is disposed in contact with the one side electrode connecting portion or the other side electrode connecting portion of the hollow tubular capacitor.

9. The inverter device according to claim 3, further including a three phase output conductor which penetrates through the inner peripheral side of the inner peripheral tubular portion of the hollow tubular capacitor and connects the legs with the three phase load.

10. The inverter device according to claim 3, further including a coaxial cable or a pair of bus bars arranged coaxially with inner/outer side which connects the one side electrode connecting portion or the other side electrode connecting portion of the hollow tubular capacitor with the DC power supply.

11. The inverter device according to claim 3 further including an annular cooling portion on the central axis line for cooling down the inverter circuit portion.

* * * * *